United States Patent [19]

Farris

[11] Patent Number: 5,341,348

[45] Date of Patent: Aug. 23, 1994

[54] SWIVEL MOUNT FOR GIMBAL GEOPHONE

[75] Inventor: Richard C. Farris, Dickinson, Tex.

[73] Assignee: Western Atlas International, Inc., Houston, Tex.

[21] Appl. No.: 91,217

[22] Filed: Jul. 13, 1993

[51] Int. Cl.⁵ .............................................. G01V 1/16
[52] U.S. Cl. ...................................... 367/154; 367/20; 367/177
[58] Field of Search .................. 367/15, 20, 154, 177; 181/112, 122, 401

[56] References Cited

U.S. PATENT DOCUMENTS

| 3,866,162 | 2/1975 | Florian | 367/154 |
| 3,954,154 | 5/1976 | Kruppenbach et al. | 181/112 |
| 4,649,530 | 3/1987 | Porter, Jr. | 367/154 |

*Primary Examiner*—Ian J. Lobo
*Attorney, Agent, or Firm*—Paul S. Madan

[57] ABSTRACT

The present invention discloses an apparatus for rotatably attaching a sensor to a cable. A cable mount having a groove about a substantial portion of its periphery is fixedly placed on the cable. A sensor mount having a key adapted to slide along the groove is rotatably placed on the cable in a manner which enables the key to remain in the groove when the sensor mount rotates about the cable.

3 Claims, 2 Drawing Sheets

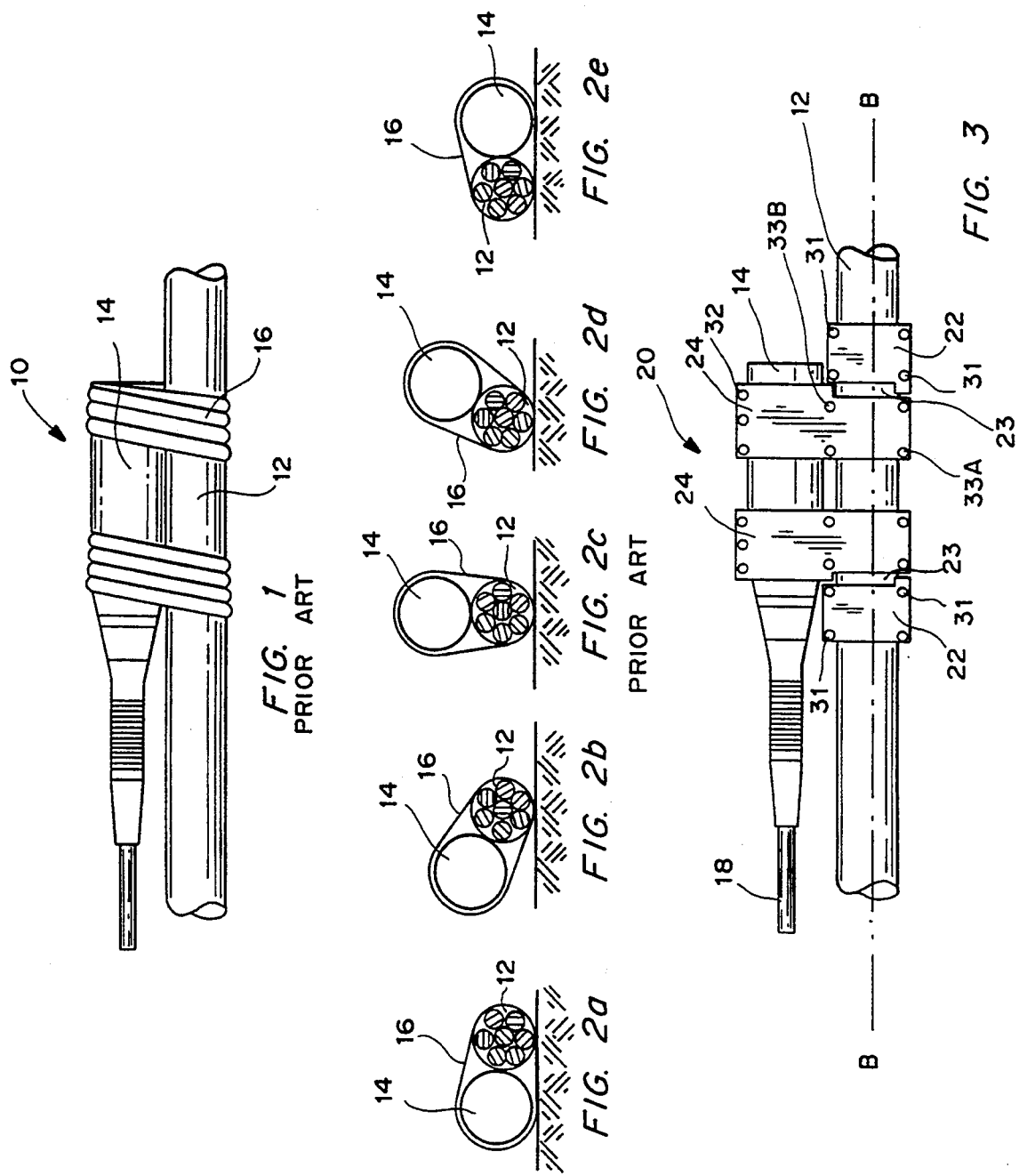

SWIVEL MOUNT FOR GIMBAL GEOPHONE

BACKGROUND OF THE INVENTION

1. Field of the Invention

This invention relates generally to the use of seismic sensors in geophysical exploration and more particularly to apparatus for attaching a seismic sensor to a cable.

2. Description of the Related Art

In geophysical (seismic) exploration, a seismic source is used to introduce a seismic signal into the earth. The seismic signal propagates through the earth in the form of a wavefront. As the wave front impinges upon the substrata layers (structural changes), a portion of the wavefront is reflected back to the earth's surface. The reflected waves are recorded by a plurality of spaced-apart sensors. The recorded data is processed to obtain geophysical information about the substrata.

To perform seismic exploration on land, in shallow water and marsh land, geophones are typically used as sensors for recording the reflected waves. Commercially available geophones for use in seismic exploration typically are magnetic type geophones. Such a geophone contains a coil and a magnet, wherein either the magnet or the coil is fixed to a housing, while the other element is freely suspended from the housing. The relative motion between the coil and the magnet produces an electromotive force between the coil and the magnet, which produces an electrical voltage (signal) that is proportional to the velocity of the motion. Such geophones require vertical or near vertical placement for optimal results.

In land seismic exploration, geophones are implanted on the earth's surface so that the geophones will remain vertical and move with the earth in response to seismic disturbances. In shallow waters and marsh lands spikes have been used to implant the geophones on the earth's surface. However, implanting geophones under water is time consuming and in many cases it is not feasible. Gimbal geophones have been designed which are fixedly attached to a cable that carries power and data signals (known in the art as the "bottom cable" or "bay cable") by metal straps and tape. Gimbal geophones ensure proper orientation of the geophone, but attaching such geophones to the cable does not ensure that the geophones will always be in contact with the earth's surface when the cable is placed on the earth's surface under water.

Tests have shown that when a geophone is in contact with the earth's surface, the quality of the signal produced is improved and the signal contains less noise compared to a geophone that is attached to the cable and which geophone is not in contact with the earth's surface.

It is therefore desirable to have an apparatus for mounting a geophone to the bay cable which will ensure that the geophone will be in contact with the earth's surface when such a cable is deployed (placed on the earth's surface), regardless of the bay cable orientation.

The present invention addresses the above-noted problem and provides apparatus for attaching geophones to a cable which ensures that the geophones will remain in contact with the earth's surface regardless of the orientation of the cable itself.

SUMMARY OF THE INVENTION

This invention provides a swivel mounted geophone on a cable which ensures that the geophone will be in contact with the earth's surface when the cable is placed on the earth's surface, regardless of the orientation of the cable. Two cable mounts are fixedly placed spaced-apart on the cable. At least one cable mount has a key groove therein along substantial portion of its periphery. A sensor mount having a key adapted to rotate in the key groove is rotatably placed between the cable mounts so that the sensor mount will rotate about the cable. A sensor having conductors extending therefrom is fixedly attached to the sensor mount with the conductors electrically coupled to the cable.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein:

FIG. 1 shows a schematic diagram of a prior art apparatus for attaching a sensor to a cable.

FIGS. 2A–2E show some of the orientations a sensor attached on a cable according to FIG. 1 may attain when the cable is deployed.

FIG. 3 shows an elevation view of the apparatus according to the present invention.

DETAILED DESCRIPTION OF THE PREFERRED EMBODIMENT

FIG. 1 shows a typical prior art apparatus 10 for attaching a sensor 14 (typically a gimbal geophone) to a bay cable 12 at a predetermined location. Metal straps and tape 16 are wrapped on the sensor 14 and the cable 12 to fixedly attach the sensor 14 to the cable 12. Conductors 18 extending from one end of the sensor 14 and are coupled to the cable 12 a suitable location (not shown).

Figure 4A:
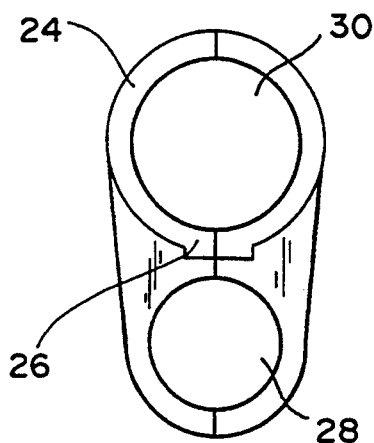
FIGS. 4A and 4B respectively show an elevation view and a side view of a sensor mount.
Figure 4B:
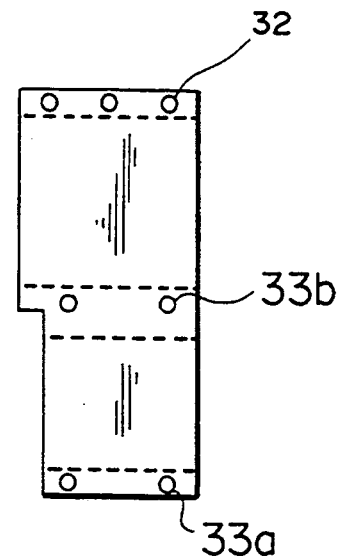
Figure 5A:
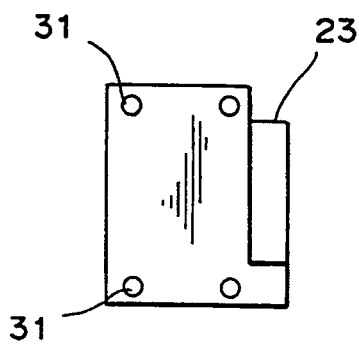
FIGS. 5A and 5B respectively show an elevation view and a side view of a cable mount.

FIGS. 2A–2E show some of the possible orientations of the gimbal geophone when the cable of FIG. 1 is deployed. When the gimbal geophone attains the positions as shown in FIGS. 2B–2D, the geophone 14 makes no contact with the earth's surface. Therefore, the seismic signal travels to the sensor 14 through the cable 12, which as noted earlier is highly undesirable. The present invention solves this problem. The apparatus of the present invention will now be described with reference to FIGS. 3–5.

FIG. 3 shows an elevation view of the apparatus 20 for mounting the sensor 14 on the cable 12 according to the present invention. Two cable mounts 22, each having an opening 27, therethrough to accommodate the cable 12 are fixedly placed spaced apart around the cable 12 by screw means 31. Each cable mount 22 contains a key groove 23 about a substantial portion of its periphery as shown by arrows A—A. Two sensor mounts 24 are used to mount the sensor 14 on the cable 12. Each sensor mount 24 has an opening 28 for accommodating the cable 12 and an opening 30 for accommodating the sensor 14. Each sensor mount 24 contains a key 26 which is designed to rotate along the key groove 23 of the cable mounts 22. The geophone is fixedly placed in the openings 30 by set screws 32 and 33b while the cable 12 is rotatably placed in the cable openings 28 by set screws 33a and 33b. The key of one sensor mount is aligned with the key groove of one cable mount while the key of the second sensor mount is aligned with the second cable mount. A cable 18 coupled to the sensor 14 for transmitting electrical power and data is coupled to an appropriate point on the cable 12 (not shown).

Figure 5B:
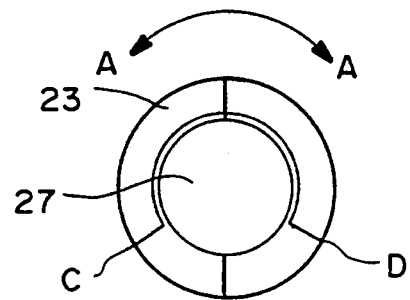

The opening 28 in the sensor mount is made sufficiently larger than the diameter of the cable so that the sensor mount may freely rotate about the cable center axis B—B. The key groove 23 is made less than 360° so that the sensor mount clamp will not rotate beyond points C and D (FIG. 5B). The rotation angle is made sufficiently large so that the sensor 14 will always make contact with the surface on which the cable 12 is placed. The complete rotation of the sensor mount is inhibited so that the conductor 18 will not loop around the cable 12.

Alternatively, only one sensor mount 24 and one cable clamp 22 may be used. A ring or some other device may be used instead of the second clamp to prevent the sensor mount clamp 24 from sliding on the cable 12. Alternatively, the two sensor mounts may be made into one member, which may be molded or machined using a desired material.

In short, in the present invention, a sensor is mounted on the cable so that it may rotate about the cable due to gravitational forces to make a contact with the earth's surface when the cable is placed on the earth regardless of the orientation of the cable itself.

The foregoing description is directed to a particular embodiment of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An apparatus for use in geophysical exploration, comprising:
   (a) a cable;
   (b) a cable mount fixedly placed on the cable, said cable mount having a groove extending around the substantial periphery of the cable mount; and
   (c) a sensor mount having a key adapted to rotate in the groove of the cable mount, said sensor mount rotatably placed on the cable in a manner which enables the key to remain in the groove when the sensor mount rotates about the cable.

2. An apparatus for use in geophysical exploration, comprising:
   (a) a cable;
   (b) a cable mount fixedly placed on the cable, said cable mount having a groove extending around the substantial periphery of the cable mount;
   (c) a sensor mount having a key adapted to rotate in the groove, said sensor mount rotatably placed on the cable in a manner which enables the key to remain in the groove when the sensor mount rotates about the cable; and
   (d) a sensor attached to the sensor mount.

3. An apparatus for use in geophysical exploration, comprising:
   (a) a cable;
   (b) two cable mounts fixedly placed spaced apart on a cable, each said cable mount having a groove extending about a substantial portion of its periphery;
   (c) two sensor mounts, each having a key adapted to be placed in the groove of the cable mounts, said sensor mounts rotatably placed about the cable between the cable mounts in a manner that enables the key of one of the sensor mounts to remain in the groove of one of the cable mounts and the key of the other sensor mount to remain in the groove of the second cable mount; and
   (d) a geophone attached to each of the sensor mounts.

* * * * *